Oct. 23, 1962 W. R. DORSEY ETAL 3,060,037
PROCESS OF DEHYDRATION
Filed Nov. 6, 1959
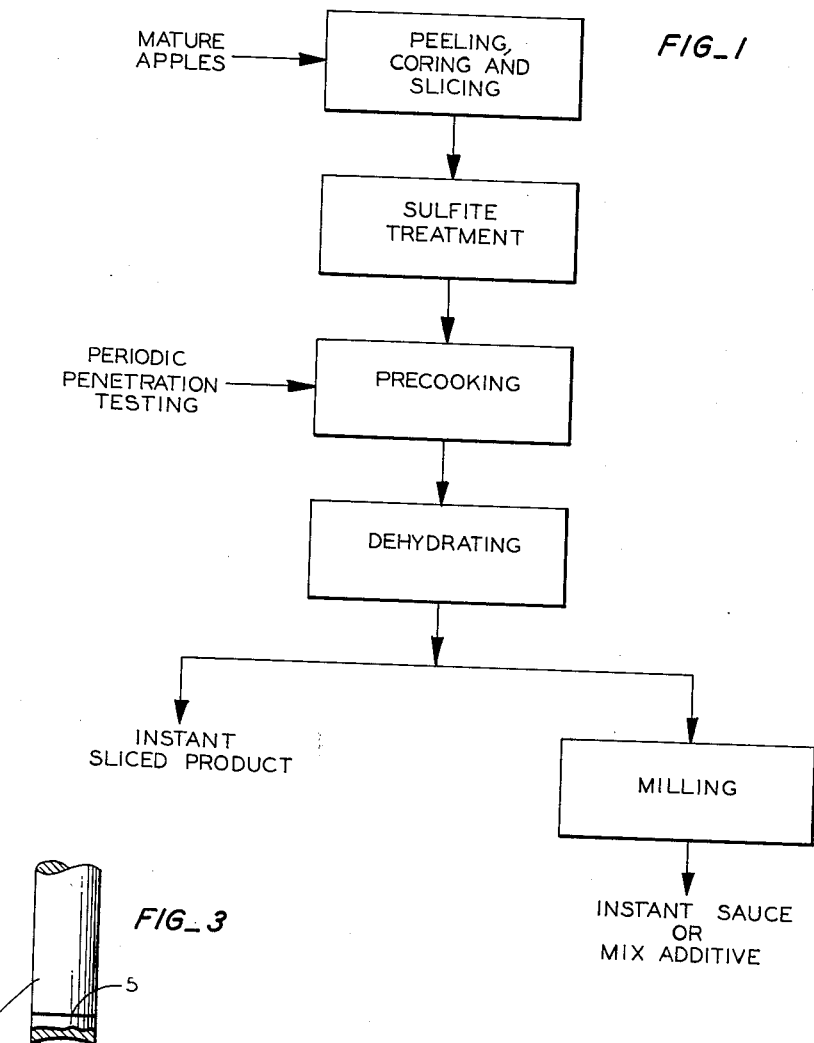
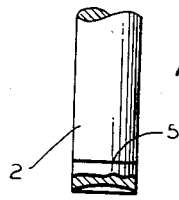
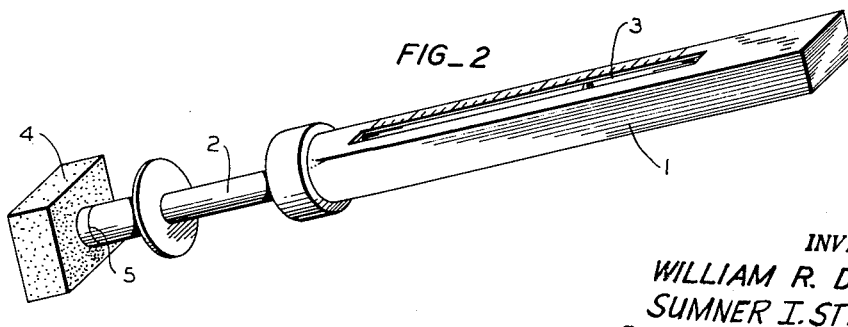
INVENTORS
WILLIAM R. DORSEY
SUMNER I. STRASHUN
BY
ATTORNEY

United States Patent Office 3,060,037
Patented Oct. 23, 1962

3,060,037
PROCESS OF DEHYDRATION
William R. Dorsey, Orinda, and Sumner I. Strashun, El Cerrito, Calif., assignors to Vacu-Dry Company, Oakland, Calif., a corporation of California
Filed Nov. 6, 1959, Ser. No. 851,394
1 Claim. (Cl. 99—204)

This invention relates generally to a process for dehydrating food products and in particular relates to a process for precooking and dehydrating applies to produce a precooked product which is instantly reconstitutable for use.

Prior to the development of the present invention it has been possible to dehydrate precooked apples into a product which is instantly reconstitutable for use merely by the addition of water. However, these dehydrated precooked apple products have not been entirely satisfactory primarily because of inadequacies in precooking techniques. If the apples have been cooked too much, they become mushy and upon dehydration dry into a gummy or sticky product. On the other hand, if the apples have not been cooked enough, after dehydration, they are not instantly reconstitutable into a precooked product.

It is one object of this invention, therefore, to control the precooking step of the process to obtain a properly dried product that is not gummy or sticky and, at the same time, one which is properly precooked so it can be instantly reconstituted for use.

Further objects of this invention will become apparent upon an understanding of the following specification of a selected embodiment of this invention, particularly when considered with the appended claims and with the drawing wherein:

FIG. 1 is a flow diagram of the process;
FIG. 2 is a perspective view of one form of fruit pressure tester being applied to the product at the precooking stage of the process; and
FIG. 3 is a partial sectional view illustrating the configuration of the free end of the pressure tester of FIG. 2.

The various stages or steps of the present process are illustrated in the flow diagram, FIG. 1, where it will be observed that as a first step of the present invention, mature apples are peeled, cored and then sliced to a convenient size, for example, approximately ¼" to ⅜" in thickness.

The sliced apples are then subjected to a sulfite treatment, well-known in this art, for the purpose of preventing oxidation of the newly exposed cut surfaces.

Subsequently, the sliced apples are precooked at a temperature of approximately 212° F. In a preferred embodiment of this invention the precooking is performed in a steam cooker or blancher. Throughout the precooking period apple samples tested to assure proper control of the precook.

In performing these control tests on the product being precooked the familiar fruit pressure tester is used. Such testers are normally utilized for determining the ripeness of fruit. One form of tester is described in Circular No. 627, United States Department of Agriculture, November 1941, pages 2–3. This pressure tester as appears in FIG. 2, consists of a metal barrel 1 within which a plunger 2 is reciprocably attached by a coil spring. The barrel carries a longitudinal groove 3 through which the restrained end of the plunger may be observed. The groove is calibrated in pounds of pressure required to force the plunger back into the barrel against the resistance of the spring. This type of tester is operated by placing the free end of the plunger against the fruit product to be tested, here an apple slice 4; forcing the plunger into the fruit flesh up to a predetermined depth; and observing the amount of force applied to obtain such penetration. The predetermined depth of penetration is established by a mark 5 on the free tip of the plunger. The amount of force required is a measure of the relative firmness of the fruit.

In applying this pressure tester to the process here disclosed, it has been found that a satisfactory final product (i.e. one that is not gummy or sticky and yet is sufficiently precooked) results only when precooking is controlled so that penetration tests on the precooked apple slices immediately prior to dehydration are within a certain critical range. This critical range is between 1 and 5 pounds on a pressure tester of the foregoing type having a ⁷⁄₁₆" diameter plunger slightly concave at its free end, as appears in FIG. 3. The slice being tested is placed against a firm backing and, in practice, the fruit resists penetration up to a certain force, whereupon the fruit suddenly yields allowing the plunger to penetrate as far as a disk of fruit compressed against the backing. The critical range refers to the force applied immediately prior to this yield point.

If the apples are cooked so long that less than 1 pound is required to drive the plunger into the apple slice, the slices are too mushy and the resultant dehydrated product becomes gummy and sticky. If the pressure required is greater than 5 pounds, the precooking is inadequate and an instantly reconstitutable product is not produced after subsequent dehydration. It has been found that the use of the foregoing pressure tester within the critical range of 1 to 5 pounds provides an accurate control of the precook either for hard or soft varieties of apples.

Immediately following the continuously monitored precooking step the apple slices are dehydrated to about 2½% moisture content on a dried basis either by air drying or in a vacuum drier. Dehydration of the slices must be commenced immediately after the foregoing critical range is attained in order to prevent further internal cooking of the hot fruit.

As a final step the dehydrated and precooked apple slices are packaged in their condition as produced from the drier and constitute a precooked sliced apple product which is instantly reconstitutable for use merely by the addition of water.

In the alternative, the process may be continued further to produce an instant apple sauce product or a cake mix additive. To produce an instant apple sauce, the dehydrated apple slices are fed to a roller mill and ground to about U.S. 16 mesh, i.e., all the product passes through a 16 mesh screen and approximately 50% is retained on a 48 mesh screen. Sugar is added to the sliced apple product prior to grinding, if desired. For producing a cake mix additive the dehydrated sliced apples are fed to a roller mill and ground to U.S. 10 mesh, i.e. all the product passes through a 10 mesh screen and 50% is retained on a 48 mesh screen.

Following the foregoing milling operations ¼ of 1% (by weight on the dried basis) of calcium stearate is added to deter caking of the ground product.

The final product, whether in the form of slices, sauce or cake mix additive, instantly reconstitutes into an apple product merely upon the addition of water and by allowing the rehydrated product to stand for at least three minutes and preferably five minutes. The product is then ready to use or to be eaten. If the firmness of the apple slices is controlled within the critical range according to the foregoing procedures during the precooking step, the final product is neither gummy nor sticky and yet is sufficiently precooked for instant reconstitution and use.

Modifications of the described process may be obvious to those skilled in this art without departing from the scope of the present invention. Therefore, this invention

I claim:

The method of making a dehydrated apple product capable of instant reconstitution upon the addition of water, including commencing with sliced fresh sulfurized apples; precooking said apple slices at a temperature of approximately 212° F.; controlling the duration of said precooking by penetration testing representative samples of said apple slices periodically during said precooking, said precooking being maintained until a pressure within the range of one to five pounds is required to penetrate said samples; and immediately after said range is attained dehydrating said precooked apple slices to a moisture content of approximately 2½% upon a dried basis.

References Cited in the file of this patent

UNITED STATES PATENTS

| | | |
|---|---|---|
| 2,155,453 | Stuntz | Apr. 25, 1939 |
| 2,192,041 | Headland | Feb. 27, 1940 |
| 2,541,859 | Callaghan et al. | Feb. 13, 1951 |
| 2,718,470 | Kaufman et al. | Sept. 20, 1955 |
| 2,895,836 | Lazar et al. | July 21, 1959 |

OTHER REFERENCES

Circular No. 627, U.S. Dept. of Agriculture, November 1941, pages 2–4 and 6–12.

Given: "Modern Encyclopedia of Cooking," J. G. Ferguson and Associates, Chicago, 1949, vol. 1, page 787.